Figure 1:
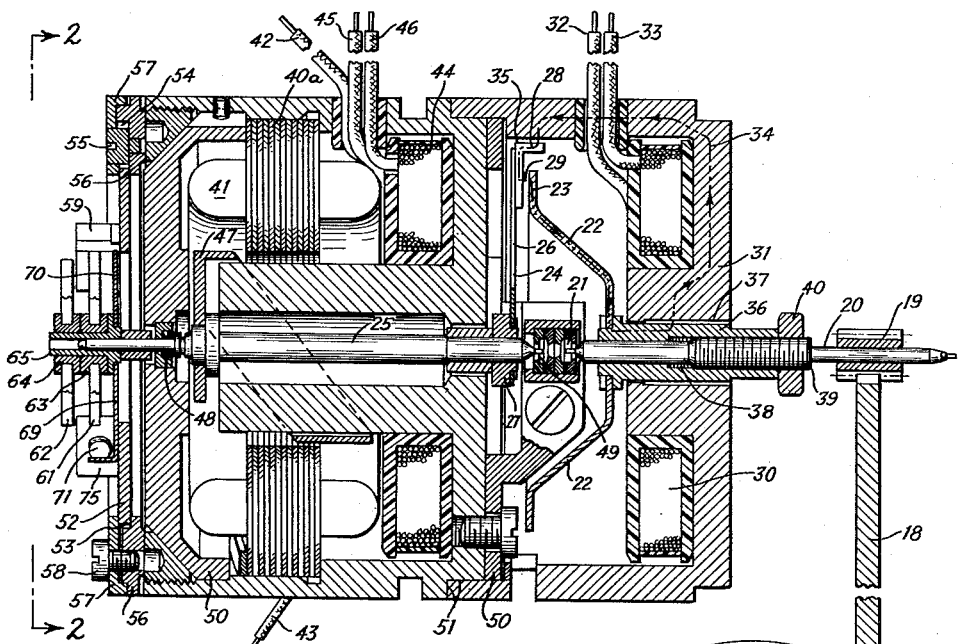

Sept. 21, 1954 M. A. ARGENTIERI ET AL 2,689,951
ALTITUDE CONTROL-SIGNAL GENERATOR
Filed Oct. 18, 1950

INVENTOR.
MICHAEL A. ARGENTIERI
JOHN H. ANDRESEN, JR.
BY
Howard G. Russell
their ATTORNEY

UNITED STATES PATENT OFFICE 2,689,951

ALTITUDE CONTROL-SIGNAL GENERATOR

Michael A. Argentieri, Newark, N. J., and John H. Andresen, Jr., Greenwood Lake, N. Y., assignors, by mesne assignments, to Kollsman Instrument Corporation, Elmhurst, N. Y., a corporation of New York Application October 18, 1950, Serial No. 190,844

1 Claim. (Cl. 340—345)

This invention relates to improvements in devices for the automatic control of aircraft in dependence on changes in altitude or, in other words, in dependence on changes in the barometric ambient pressure.

Numerous devices are in existence, and others have been proposed, for producing an electric signal, for example a signal voltage, when the ambient barometric pressure, due to a change in altitude of the aircraft, changes.

According to a preferred construction an electric signal generator is coupled by an electromagnetic clutch barometric device, for example with an altimeter mechanism operated by an evacuated diaphragm, when a certain altitude is to be maintained. At the time of coupling with the altitude responsive device, the signal generator is in its zero, or minimum-signal position, and the subsequent rising and falling of the aircraft causes actuation of the signal generator in one sense or the other, leading to the generation of an electric impulse of a positive or negative sense, which is then fed into an automatic control device operating the control surface or surfaces of the aircraft.

The present invention is directed to improvements and refinements of the latter type of electric signal generator. The invention provides an extremely sensitive signal generator, substantially uninfluenced by temperature changes, instantaneously and positively responsive to changes in altitude, and offers numerous advantages in the construction, calibration, and adjustment of the device. The improved device also includes provision for positively limiting the magnitude of the signals generated to a predetermined maximum, so that the control surfaces of the craft are not deflected to unsafe angles due to the generation of an electric signal of an extraordinary magnitude if a sudden unusually large change in altitude occurs.

The objects, features and advantages of this invention will appear more fully from the detailed description which follows, accompanied by drawings, showing, for the purpose of illustration a preferred embodiment of the invention. The invention also consists in certain new and original features of construction and combination of elements hereinafter set forth and claimed.

Figure 2:
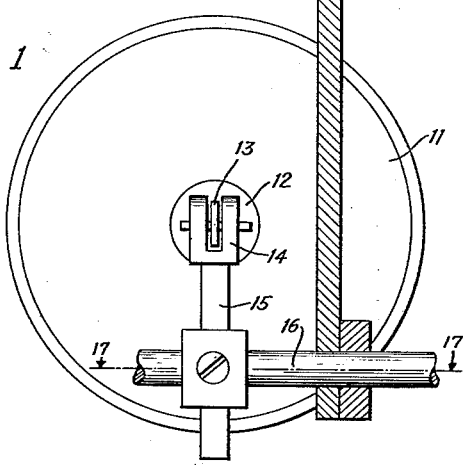
Figure 2:
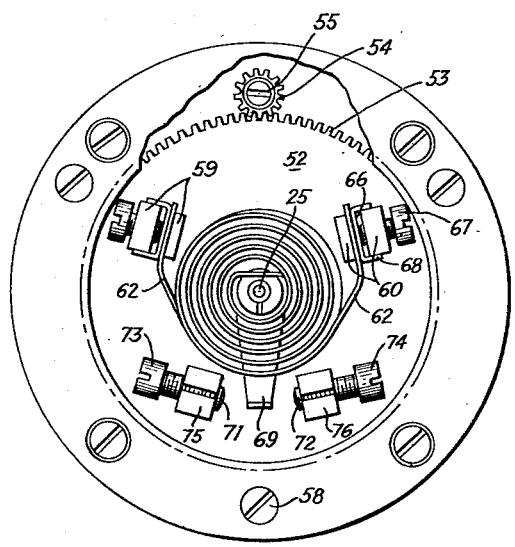

Although the characteristic features of this invention which are believed to be novel will be particularly pointed out in the claim appended hereto, the invention itself, its objects and advantages and the manner in which it may be carried out may be better understood by referring to the following description taken in connection with the accompanying drawings forming a part of it in which:

Figure 1 is a side view, largely in cross section, of a preferred form of apparatus embodying the invention; and Figure 2 is an end view of the device shown in Figure 1, the view being taken in the direction 2—2 marked in Figure 1.

In the following description and in the claim various details will be identified by specific names for convenience. The names, however, are intended to be as generic in their application as the art will permit. Corresponding reference characters refer to corresponding parts in the several figures of the drawings.

In the drawings accompanying, and forming part of, this specification, certain specific disclosure of the invention is made for the purpose of explanation of broader aspects of the invention, but it is understood that the details may be modified in various respects and that the invention may be applied to other structures than the one shown.

In Figure 1 the altitude responsive device is represented, for convenience, by an aneroid capsule 11 commonly found in altimeters of the barometric pressure type. The diaphragm capsule has a central boss 12 to which one end of a link 13 is hinged, the other end of the link engaging the forked end 14 of an arm 15 mounted on a rocking shaft 16 suitably supported for movement about a rocking shaft axis 17—17. The rocking shaft carries a gear sector 18 meshing with a pinion 19. The structure thus far described is quite conventional and is found in most forms of barometric altimeters.

The pinion 19 is mounted on an input or actuating shaft 20 supported in suitable bearings one of which is shown at 21. The input shaft 20 carries a clutch element 22 of magnetizable material having a flange 23 providing a clutch surface. A second clutch element 24 is mounted on a rotor shaft 25 of a signal generator about to be described. The clutch element 24 is in the form of two or three arms, each containing a flat spring 26 mounted on the rotor shaft 25 by means of a bushing 27 and carrying at its free end a substantially L-shaped armature 28 of magnetizable material. In disengaged position, in which the clutch elements are shown, the armature 28 is spaced from the flange 23 by a narrow gap 29. Upon energizing of the clutch, however, the armature 28 moves towards and against the flange 23, thereby flexing its supporting spring arm 26. The frictional engagement thus produced between the armature 28 and the clutch flange 23 causes rotary motion of the input shaft 20 to be transmitted to the rotor shaft 25.

The magnetic clutch comprises an energizing winding 30 mounted in the clutch housing 31 of magnetizable material. The energizing winding has two leads 32 and 33 leading to a source of direct current (not shown). When the winding 30 is energized a magnetic flux is caused to flow, the path of the flux being indicated in the drawings by a dash-double-dot-line 34. More particularly, the flux passes through the housing 51 thence across a narrow permanent gap 35 into the armature 28 and from there through the clutch element 22 closing the non-permanent gap 29. From the clutch element 22 the flux passes through a magnetizable shaft bushing 36 and returns to the housing 31 over a narrow permanent central gap 37.

The bushing 36 has a threaded bore 38 engaging screw threads 39 on the input shaft 20. The threads permit longitudinal adjustment of the clutch element 22 with respect to the flexible clutch element 24, and a lock nut 40 is provided for arresting the bushing 36 in adjusted position on the input shaft.

The signal generator proper comprises a stator 40 carrying a three phase exciting winding 41, only one phase of which is eventually used, as will later become apparent. Two of the leads of the exciting winding are visible at 42 and 43, the third lead is not visible, due to the section taken. A secondary or output winding 44 has output leads 45 and 46. A rotor body 47 of electrically conductive material is mounted on the rotor shaft 25 and causes a voltage to be induced in the secondary winding, depending on the rotary position of the rotor with respect to the energized phase of the exciting winding 41.

The rotor shaft 25 is mounted in the generator housing 50 in precision bearings 48 and 49, preferably of the jewel type. The generator housing has a shoulder 51 on which the end portion of the clutch housing 31 is seated for concentric assembly of the clutch with the signal generator.

The generator shaft 25 extends through the end wall of the generator housing 50 which carries a rotatable base plate 52. The base plate 52 has gear teeth 53 on its periphery meshing with a pinion 54 having a slot 55 in its hub for turning of the pinion with a screw driver. The base plate 52 rests on a flange 56 on the generator housing and may be arrested against turning with respect to the generator housing by a clamping plate 57 overlying the base plate 52. Clamping screws 58 extend through holes in the clamping plate 57 and are screwed into tapped holes in the flange 56 for tightening and loosening the base plate 52, as may be required.

The base plate 52 carries two clamping posts 59 and 60 for supporting the outer ends of two hairsprings 61 and 62. The hairsprings are wound in opposite directions and their inner ends are secured in bushings 63 and 64 fixed on a sleeve 65. The bushings are press-fitted on the sleeve 65 and the sleeve, in turn, is press-fitted on the rotor shaft 25 so that, upon rotation of the rotor shaft one of the hairsprings is wound and the other hairspring unwound.

The hairspring assembly is uneffected by changes in temperature since changes in length of one spring are counteracted by equal changes in length of the other spring, both springs being of equal dimensions.

The clamping posts 59 and 60 have slots 66 into which the ends of the hairsprings are inserted. A set screw 67 bears upon a pressure plate 68 and clamps the hairsprings in position without danger of tilting or distorting the spring from its plane at right angles to the rotor shaft.

The sleeve 65 also carries a stop arm 69 counterbalanced at 70 and movable between two limit stops 71 and 72. Each stop is formed by a screw 73, 74 extending through posts 75 and 76 on the base plate 52.

Adjustment, use, and operation of the device is as follows:

An alternating voltage is first applied to each of the three phases of the exciting winding 41 and the rotor shaft 25 is manually turned through 360 degrees. This is preferably done before the sleeve 65 carrying the hairsprings and the stop arm affixed to the rotor shaft. Also the bushing 27 carrying the clutch element 24 is still unassembled since the arms or springs 26 would prevent rotation of the rotor shaft 25 through 360 degrees.

The signal voltage induced in the output winding 44 is measured for each of the three phases. Almost invariably it will be found that the minimum voltage, representing the null or zero signal, is lower in the use of one particular phase than in the use of any one of the other two phases. The phase giving the lowest non signal voltage is selected for further use and the other two phases remain unused.

The rotor is then moved into zero position with respect to the phase to be used, the base plate 52 is adjusted by turning the pinion 54 and the sleeve 65 carrying the hairspring and the stop arm is affixed to the rotor shaft 25 so that the stop arm 69 lies in the center position between the stops 71 and 72. The outer ends of the hairsprings are then clamped to their respective clamping posts 59 and 60. Subsequent adjustments are made by turning of the pinion 54 and by setting of the stop screws 73 and 74. The device is then partially disassembled for mounting of the coupling bushing 27, whereafter the housing is reassembled and the proper clutch gap 29 is adjusted as hereinbefore described.

The device operates in aircraft as follows:

During ascent of the plane of the diaphragm capsule 11 expands causing the gear sector 18 to move towards the observer thereby turning the pinion in clock-wise direction, if the device is viewed from the pinion side. The clutch elements 22 turns freely with respect to the clutch element 24 which remains stationary due to the action of the two hairsprings which maintain the rotor 47 in its null position.

When a constant altitude is to be maintained the clutch winding 30 is energized causing further rotation of the pinion 19 to be transmitted to the rotor 47. Turning of the rotor in a clock-wise sense due to rising of the craft causes a signal voltage of one sign to be induced in the output winding, and turning of the pinion in the counterclockwise direction due to falling of the craft causes a signal of the opposite sign to be generated. The signals are fed into an automatic control device of conventional design which actuates the control surfaces of the plane in a sense to reestablish the original altitude at which the clutch was closed. The limit stops prevent these signals from exceeding a predetermined magnitude, so that unduly large deflection of the control surfaces are prevented. If sudden large changes in altitude occur, the rotor 47 is moved as far as the limit stops permit. Further movement of the pinion is then arrested by the resistance of the blocked rotor which temporarily imposes a load on the diaphragm 11 until the craft has returned to its proper altitude. Should an excessive altitude change occur the clutch will slip to avoid damage to the mechanism.

The invention thus provides an improved device producing positive and definite signals due to its freedom from back lash and freedom from initial tension at the rotor constraining hairspring assembly. This is a feature leading to more sensitive, more accurate and more reliable control of the aircraft. The device is easy to adjust and calibrate, possesses a particularly low null signal, and furnishes positive and definite control signals.

What is claimed is:

A device for producing an electric signal in response to a change in barometric pressure, more particularly in response to a change in altitude, the device comprising, in combination, an electric signal generator including a stator, an input winding on the stator for setting up a flux, an output winding on the stator, and a rotor within the flux path, said rotor including a rotor shaft; an actuating shaft coaxial with the rotor shaft for actuation by a pressure responsive element; a magnetic clutch including an energizing winding for setting up a magnetic field, a first clutch element on one of said shafts, a second clutch element on the other of said shafts, said two clutch elements being normally spaced by a gap in released condition, at least one of the two clutch elements being movable towards the other to close the gap and engage the other element when the field is excited; a base mounted on said stator coaxially with said rotor, said base having a gear-tooth portion; a pinion mounted on said stator, said pinion meshing with said gear-tooth portion for adjustment of the clock-dial position of said base with respect to said stator; means for arresting said base with respect to said stator in adjusted position; a pair of counterwound hairsprings secured with their ends to said base and to said rotor shaft, respectively for biasing said rotor towards a predetermined position with respect to said stator; an arm on said rotor shaft; and a pair of stops on said base for limiting the movement of said arm about the rotor axis to a predetermined angle with respect to said base, thereby limiting the magnitude of the signal to a predetermined maximum.

References Cited in the file of this patent

UNITED STATES PATENTS

| Number | Name | Date |
|---|---|---|
| 2,241,548 | Frischknecht | May 13, 1941 |
| 2,446,546 | Meston | Aug. 10, 1948 |
| 2,512,902 | Rossire | June 27, 1950 |

FOREIGN PATENTS

| Number | Country | Date |
|---|---|---|
| 9,351 | Great Britain | Apr. 20, 1907 |